United States Patent
Choi

(10) Patent No.: US 9,769,741 B2
(45) Date of Patent: Sep. 19, 2017

(54) ADD-ON COMMUNICATION APPARATUS ATTACHED TO CABLE INSTALLMENT TYPE CHARGING CONTROL APPARATUS AND METHOD THEREOF

(71) Applicant: LSIS CO., LTD., Anyang-si, Gyeonggi-do (KR)

(72) Inventor: Seung Woo Choi, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 244 days.

(21) Appl. No.: 14/285,392

(22) Filed: May 22, 2014

(65) Prior Publication Data
US 2015/0017921 A1    Jan. 15, 2015

(30) Foreign Application Priority Data
Jul. 10, 2013 (KR) .................. 10-2013-0080746

(51) Int. Cl.
*H04W 48/18* (2009.01)
*B60L 11/18* (2006.01)
(Continued)

(52) U.S. Cl.
CPC ........... *H04W 48/18* (2013.01); *B60L 3/0069* (2013.01); *B60L 11/1816* (2013.01); *B60L 11/1846* (2013.01); *B60L 11/1861* (2013.01); *H04B 1/401* (2013.01); *B60L 2230/12* (2013.01); *B60L 2230/16* (2013.01); *B60L 2230/40* (2013.01);
(Continued)

(58) Field of Classification Search
CPC combination set(s) only.
See application file for complete search history.

(56) References Cited

U.S. PATENT DOCUMENTS

| | | |
|---|---|---|
| 2010/0169515 A1 | 7/2010 | Lee et al. |
| 2010/0174667 A1 | 7/2010 | Vitale et al. |

(Continued)

FOREIGN PATENT DOCUMENTS

| | | |
|---|---|---|
| CN | 102969747 | 3/2013 |
| EP | 2455924 | 5/2012 |

(Continued)

OTHER PUBLICATIONS

Japan Patent Office Application Serial No. 2014-123178, Office Action dated May 11, 2015, 3 pages.
(Continued)

*Primary Examiner* — Ankur Jain
*Assistant Examiner* — Zhitong Chen
(74) *Attorney, Agent, or Firm* — Lee, Hong, Degerman, Kang & Waimey

(57) ABSTRACT

An add-on communication device attached to a cable-mounted charging control device integrated with a cable assembly for charging an electric vehicle includes a control unit and a plurality of communication modules for communicating with a terminal device. The control unit determines a first communication module for transmitting a message, from among the plurality of communication modules. The control unit determines a second communication module for retransmitting the message, from among the plurality of communication modules excepting the first communication module, when reception of an acknowledgement message indicating normal reception of the message by the terminal device is abnormal.

13 Claims, 11 Drawing Sheets

(51) Int. Cl.
*B60L 3/00* (2006.01)
*H04B 1/401* (2015.01)
*H04L 29/08* (2006.01)
*H04W 88/06* (2009.01)

(52) U.S. Cl.
CPC ........... *H04L 67/125* (2013.01); *H04W 88/06* (2013.01); *Y02T 10/705* (2013.01); *Y02T 10/7005* (2013.01); *Y02T 10/7044* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | | |
|---|---|---|---|
| 2010/0279733 A1* | 11/2010 | Karsten | H04W 48/18 455/552.1 |
| 2010/0306033 A1 | 12/2010 | Oved et al. | |
| 2011/0172839 A1 | 7/2011 | Brown | |
| 2011/0175569 A1* | 7/2011 | Austin | B60L 11/1824 320/109 |
| 2012/0039248 A1 | 2/2012 | Schneider et al. | |
| 2012/0109798 A1 | 5/2012 | Shelton et al. | |
| 2012/0194128 A1* | 8/2012 | Laberteaux | B60L 11/1818 320/109 |
| 2012/0319648 A1* | 12/2012 | Ohtomo | B60L 3/0069 320/109 |
| 2013/0078980 A1 | 3/2013 | Saito | |
| 2015/0263549 A1* | 9/2015 | Lee | H01M 10/48 361/93.4 |

FOREIGN PATENT DOCUMENTS

| | | |
|---|---|---|
| JP | 2002-141857 | 5/2002 |
| JP | 2009-296244 | 12/2009 |
| JP | 2010-061506 | 3/2010 |
| JP | 2010-087876 | 4/2010 |
| JP | 2010-110051 | 5/2010 |
| JP | 2011-250617 | 12/2011 |
| KR | 20120130432 | 12/2012 |
| KR | 20130047905 | 5/2013 |
| WO | 2010/022059 | 2/2010 |
| WO | 2013/058614 | 4/2013 |

OTHER PUBLICATIONS

The State Intellectual Property Office of the People's Republic of China Application Serial No. 201410325870.6, Office Action dated Dec. 4, 2015, 8 pages.

European Patent Office Application Serial No. 14172875.8, Search Report dated Jun. 24, 2015, 11 pages.

State Intellectual Property Office of the People's Republic of China Application Serial No. 201410325870.6, Office Action dated Aug. 15, 2016, 10 pages.

Korean Intellectual Property Office Application Serial No. 10-2013-0080746, Notice of Allowance dated Aug. 2, 2017, 6 pages.

* cited by examiner

ADD-ON COMMUNICATION APPARATUS ATTACHED TO CABLE INSTALLMENT TYPE CHARGING CONTROL APPARATUS AND METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2013-0080746, filed Jul. 10, 2013, the contents of which are all hereby incorporated by reference herein in its entirety.

BACKGROUND

The present disclosure relates to a charging technology for an electric vehicle.

An electric vehicle, which is driven with electric power, may be classified into a battery-powered electric vehicle and a hybrid electric vehicle. Here, the battery-powered electric vehicle is driven with electric power alone without being supplied with fossil fuels, and is generally called an electric vehicle. The hybrid electric vehicle is driven with electric power and fossil fuels. Such an electric vehicle is provided with a battery for supplying electric power. In particular, a battery of the battery-powered electric vehicle or a plug-in-type hybrid electric vehicle is charged with power supplied from an external power supply, and an electric motor thereof is driven with the power charged in the battery.

When an electric vehicle is charged with 60 Hz commercial grid power provided through a socket installed in a home, an electric vehicle charging cable assembly is used.

The electric vehicle charging cable assembly includes a connector connected to an electric vehicle, a plug connected to a socket, and a power cable for connecting the connector and the plug.

Since the electric vehicle charging cable assembly is used in various environments, a cable-mounted charging control device for stable charging of an electric vehicle may be provided to the electric vehicle charging cable assembly. The cable-mounted charging control device is integrated with a power cable so as not to be easily separated from the power cable. In order for the cable-mounted charging control device to enable stable charging of an electric vehicle, the cable-mounted charging control device may need to be resistant to external temperature, external humidity, vibration and impact. In the case where the cable-mounted charging control device is provided with a connector for wired communication, the cable-mounted charging control device may not satisfy the above-mentioned requirements since the connector includes a metal terminal.

A user may need to check a charging state. Therefore, the cable-mounted charging control device that is integrated with the electric vehicle charging cable assembly may need to notify the charging state to the user.

To this end, the cable-mounted charging control device displays information on charging or failure information through an LED of predetermined color.

That is, the user should watch the cable-mounted charging control device to obtain the information on charging. The user may need to check the charging state in rainy, cold or hot weather. In such a weather condition, the user may experience inconvenience.

SUMMARY

Embodiments provide a system, device and method for providing electric vehicle charging-related information to a user with ease.

In one embodiment, an add-on communication device attached to a cable-mounted charging control device attached to a cable assembly for charging an electric vehicle includes: a plurality of communication modules for communicating with a terminal device; and a control unit, wherein the control unit generates a message, determines a first communication module for transmitting the message, from among the plurality of communication modules, transmits the message to the terminal device through the first communication module, determines a second communication module for retransmitting the message, from among the plurality of communication modules excepting the first communication module, when reception of an acknowledgement message indicating normal reception of the message by the terminal device is abnormal, and retransmits the message to the terminal device through the second communication module.

The control unit may determine the first communication module on the basis of priority orders assigned to the plurality of communication modules, and determine the second communication module on the basis of the priority orders assigned to the plurality of communication modules.

A highest priority order may be assigned to a wireless local area network communication module from among the plurality of communication modules.

A second highest priority order may be assigned to a wireless wide area network communication module from among the plurality of communication modules.

The first communication module may be the wireless local area network communication module, and The second communication module may be the wireless wide area network communication module.

The control unit may obtain charging-related information from the cable-mounted charging control device, and generate the message on the basis of the charging-related information.

The control unit may check whether a charging-related event occurs on the basis of the charging-related information, and generate the message including the charging-related event when the charging-related event occurs.

The charging-related event may include at least one of completion of charging of the electric vehicle, occurrence of an error in charging of the electric vehicle, an intensity of current applied to the electric vehicle being outside a normal range, occurrence of a failure in the cable assembly, change of an on/off state of a relay in the cable-mounted charging control device, occurrence of fusion of the relay in the cable-mounted charging control device, a temperature of the cable assembly being outside a normal range, occurrence of a short circuit of the cable assembly, occurrence of an open circuit of the cable assembly, and a peripheral environment factor of the cable assembly being outside a normal range.

The control unit may generate the message including the charging-related information on the basis of the charging-related information.

The charging-related information may include at least one of information on the electric vehicle and information on the cable assembly.

The control unit may assign a highest priority order to a communication module that has received an immediately previous message from the communication device immediately before transmitting the message, from among the plurality of communication modules.

DETAILED DESCRIPTION OF THE EMBODIMENTS

Hereinafter, embodiments will be described in detail with reference to the accompanying drawings. In the following description, the terms "module" and "unit" for referring to elements are assigned and used exchangeably in consideration of convenience of explanation, and thus, the terms per se do not necessarily have different meanings or functions.

A terminal device described herein may include a mobile phone, a smartphone, a notebook computer, a terminal for digital broadcast, a personal digital assistant (PDA), a portable multimedia player (PMP) and a navigator. However, those skilled in the art understand that configurations according to the embodiments described herein may also be applied to not only mobile devices but also non-mobile devices such as digital TVs and desktop computers.

Hereinafter, an electric vehicle charging system according to a first embodiment will be described in detail with reference to the accompanying drawings.

Figure 1:
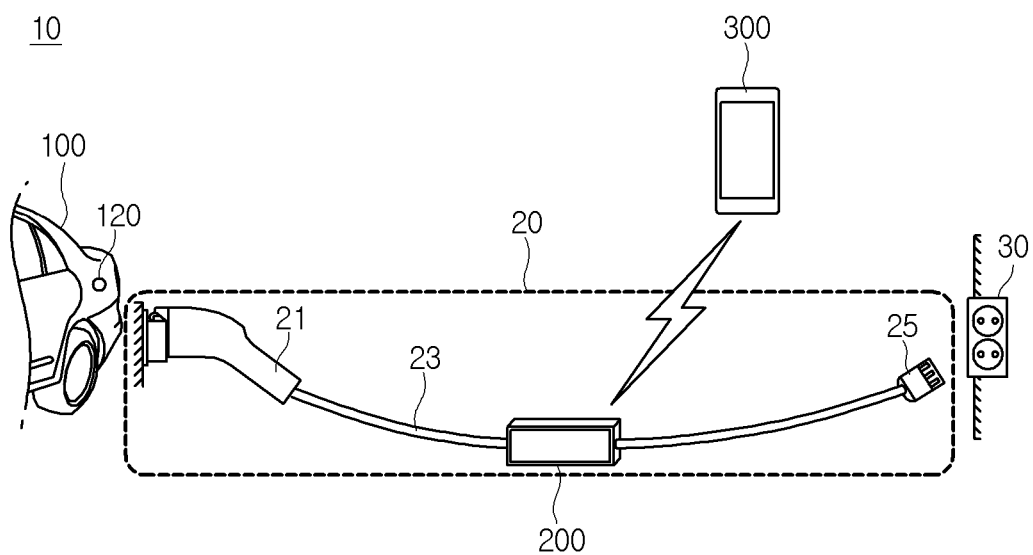
FIG. 1 is a conceptual diagram illustrating an electric vehicle charging system according to an embodiment.

FIG. 1 is a conceptual diagram illustrating an electric vehicle charging system according to an embodiment.

Referring to FIG. 1, an electric vehicle charging system 10 according to an embodiment includes an electric vehicle 100, an electric vehicle charging cable assembly 20, a socket 30, and a terminal device 300.

The socket 30 provides alternating current (AC) power.

The electric vehicle 100 is connected to the socket 30 through the electric vehicle charging cable assembly 20 so as to be provided with the AC power.

The electric vehicle charging cable assembly 20 transfers the AC power from the socket 30 to the electric vehicle 100.

The electric vehicle charging cable assembly 20 includes a cable-mounted charging control device 200, an electric vehicle connector 21, a power cable 23, and a plug 25.

The power cable 23 transfers power. The power cable 23 may include an electric-vehicle-side power cable and a grid-side power cable.

The electric vehicle connector 21 may be inserted into an electric vehicle inlet 120 so as to be coupled therewith, and may comply with SAE J1772 standard.

The plug 25 is inserted into the socket 30 so as to be coupled therewith.

The cable-mounted charging control device 200 monitors charging of the electric vehicle 100, provides charging-related information obtained through the monitoring to the terminal device 300, and controls the charging of the electric vehicle 100.

According to an embodiment, the cable-mounted charging control device 200 is fixedly attached to the power cable 23 by a user so as not to be easily separated from the power cable 23, and is resistant to external temperature, external humidity, vibration and impact.

In particular, the cable-installed charging control device 200 may be fixedly attached to a power cable 53 by the user so as to be integrated with the power cable 53 and not to be easily separated from the electric-vehicle-side power cable.

Furthermore, the cable-installed charging control device 200 may be fixedly attached to a power cable 63 by the user so as to be integrated with the power cable 63 and not to be easily separated from the grid-side power cable.

According to an embodiment, the cable-mounted charging control device 200 may include a connector so as to be coupled with or separated from the power cable 23 by the user. Here, the connector may need to be resistant to external temperature, external humidity, vibration and impact.

In particular, the cable-mounted charging control device 200 may include a connector so as to be coupled with or separated from the electric-vehicle-side power cable by the user. Here, the connector may need to be resistant to external temperature, external humidity, vibration and impact.

Furthermore, the cable-mounted charging control device 200 may include a connector so as to be coupled with or separated from the grid-side power cable by the user. Here, the connector may need to be resistant to external temperature, external humidity, vibration and impact.

In the case where the cable-mounted charging control device 200 is provided with a connector for wired communication, the cable-mounted charging control device may be vulnerable to an external environment since the connector includes a metal terminal. To overcome this limitation, the cable-mounted charging control device 200 may wirelessly transmit the charging-related information to the terminal device 300.

The terminal device 300 wirelessly communicates with the electric vehicle charging cable assembly 20 in a non-contact manner so as to display information on the electric vehicle charging cable assembly 20.

Figure 2:
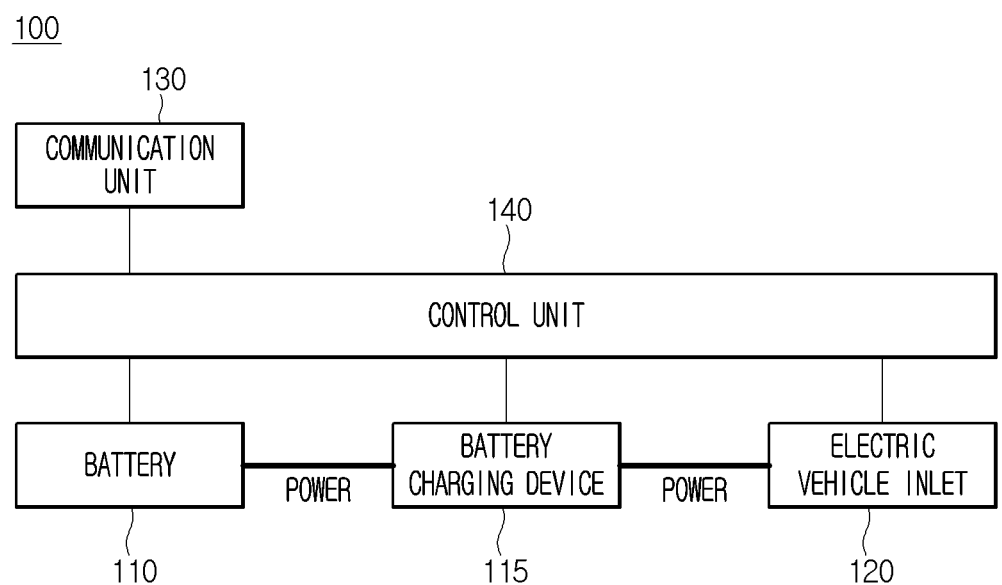
FIG. 2 is a block diagram illustrating an electric vehicle according to an embodiment.

FIG. 2 is a block diagram illustrating an electric vehicle according to an embodiment.

The electric vehicle 100 includes a battery 110, a battery charging device 115, the electric vehicle inlet 120, a communication unit 130, and a control unit 140.

The battery 110 provides power for driving the electric vehicle 100 to the electric vehicle 100.

The electric vehicle inlet 120 is a connector for receiving, from the outside, power for charging the battery 110. The electric vehicle inlet 120 may comply with SAE J1772 standard.

The battery charging device 115 charges the battery 110 by using the power provided through the electric vehicle inlet 120.

The communication unit 130 may communicate with the electric vehicle charging cable assembly 20 or the terminal device 300.

The control unit 140 controls the overall operation of the electric vehicle 100.

Figure 3:
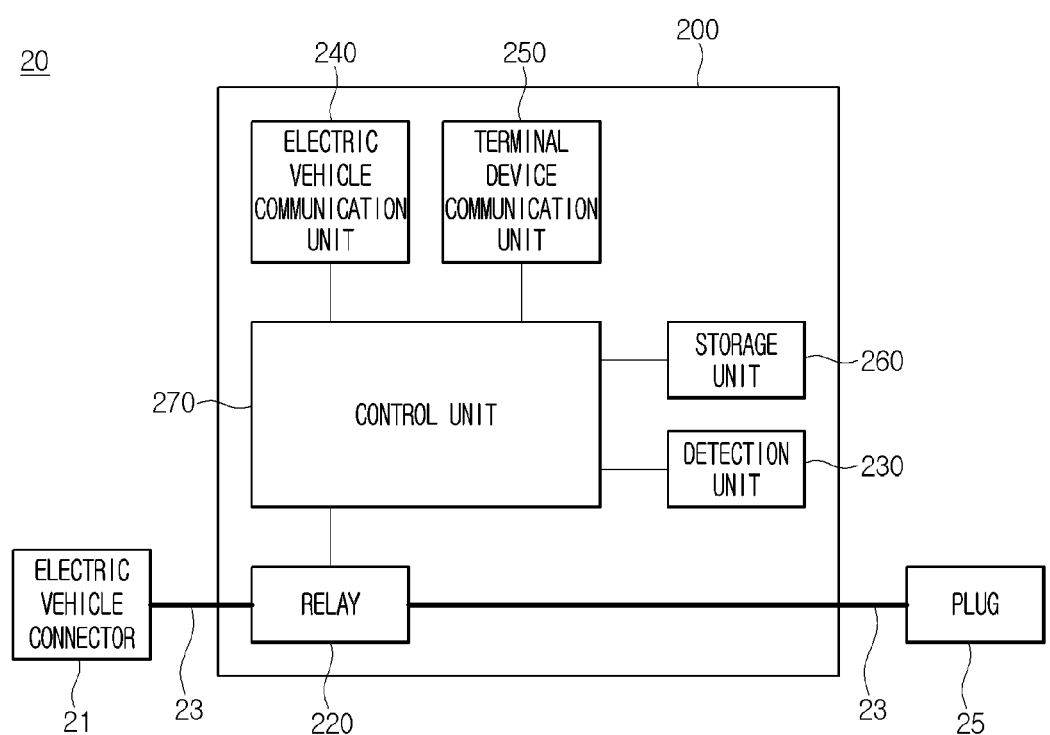
FIG. 3 is a diagram illustrating an electric vehicle charging cable assembly according to an embodiment.

FIG. 3 is a diagram illustrating the electric vehicle charging cable assembly according to an embodiment.

As described above, the electric vehicle charging cable assembly 20 includes the cable-mounted charging control device 200, the electric vehicle connector 21, the power cable 23, and the plug 25.

The cable-mounted charging control device 200 includes a relay 220, a detection unit 230, an electric vehicle communication unit 240, a terminal device communication unit 250, a storage unit 260, and a control unit 270.

The relay controls the transfer of power through the power cable 23. In detail, when the relay 220 is turned off, the relay 220 blocks the transfer of power through the power cable 23. When the relay 220 is turned on, the relay 220 allows the transfer of power through the power cable 23.

The detection unit 230 detects electric vehicle charging-related information that will be described later. In particular, the detection unit 230 may detect both information on the electric vehicle 100 and information on the electric vehicle charging cable assembly 20. The detection unit 230 may not detect the information on the electric vehicle 100 but may detect the information on the electric vehicle charging cable assembly 20. In detail, the detection unit 230 may include a relay fusion detector, a current detector, an internal temperature detector, an internal humidify detector, an external temperature detector, an external humidity detector, a short circuit detector, and an open circuit detector. The relay fusion detector may detect whether the relay 220 is fused. The current detector may detect an intensity of current that flows through the power cable 23. The internal temperature detector may detect an internal temperature of the electric vehicle charging cable assembly 20. The internal humidity detector may detect an internal humidity of the electric vehicle charging cable assembly 20. The external temperature detector detects a peripheral temperature of the cable-mounted charging control device 200. The external humidity detector detects a peripheral humidity of the cable-mounted charging control device 200. The short circuit detector may detect whether the electric vehicle charging cable assembly 20 is short circuited. The open circuit detector may detect whether the electric vehicle charging cable assembly 20 is open circuited.

The electric vehicle communication unit 240 communicates with the electric vehicle 100. In detail, the electric vehicle communication unit 240 communicates with the communication unit 130 of the electric vehicle 100. The electric vehicle communication unit 240 may communicate with the communication unit 130 through the power cable 23 using a power line communication technology. The electric vehicle communication unit 240 may communicate with the communication unit 130 using a communication technology such as infrared data association (IrDA), radio frequency communication, Bluetooth, ultra wideband (UWB) communication, ZigBee, or digital living network alliance (DLNA).

The terminal device communication unit 250 communicates with the terminal device 300. In detail, the terminal device communication unit 250 communicates with a communication unit 310 of the terminal device 300. In particular, the terminal device communication unit 250 may communicate with the communication unit 310 using a communication technology such as infrared data association (IrDA), radio frequency communication, Bluetooth, ultra wideband (UWB) communication, ZigBee, or digital living network alliance (DLNA).

The storage unit 260 stores various pieces of information that will be described later. In detail, the storage unit 260 may store the electric vehicle charging-related information. The storage unit 260 may store information on a use history of the cable-mounted charging control device 200. For example, the storage unit 260 may store information on a most recent use time and an accumulated use time of the cable-mounted charging control device 200.

The control unit 270 controls the overall operation of the cable-mounted charging control device 200

Figure 4:
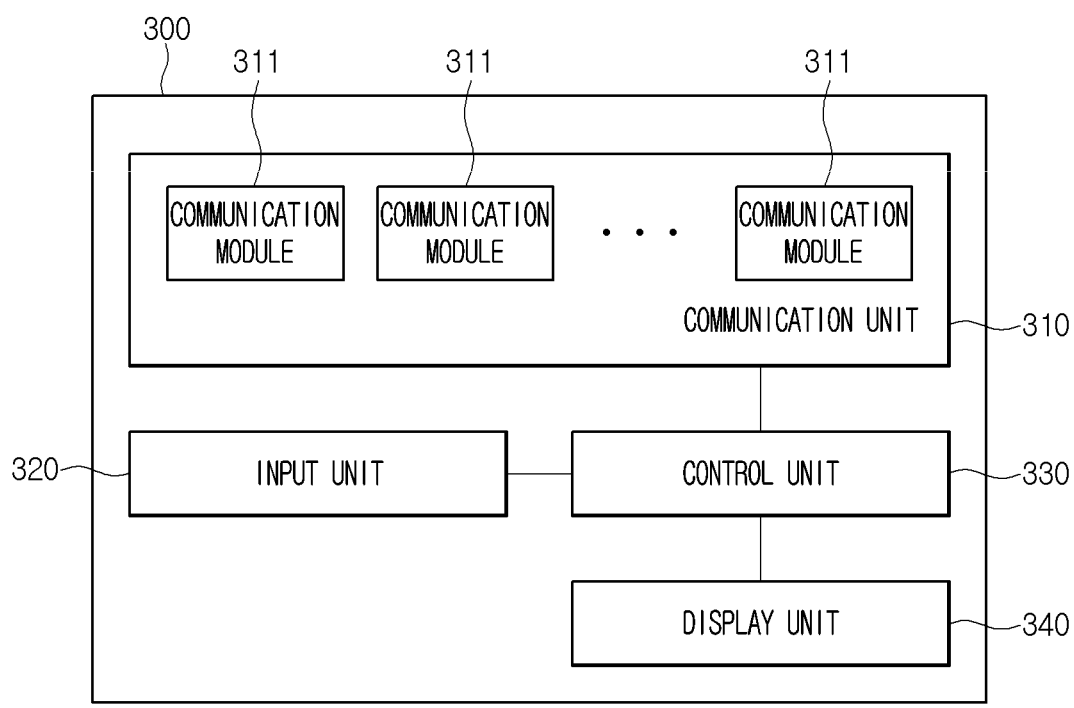
FIG. 4 is a block diagram illustrating a terminal device according to an embodiment.

FIG. 4 is a block diagram illustrating the terminal device according to an embodiment.

The terminal device 300 includes the communication unit 310, an input device 320, a control unit 330, and a display unit 340.

The communication unit 310 communicates with the terminal device communication unit 250. The communication unit 310 may include a plurality of communication modules 311. In detail, the plurality of communication modules 311 may include an infrared communication module, a Bluetooth communication module, a wireless local area network (WLAN) communication module for WLAN communication such as WI-FI, and a wireless wide area network (WWAN) communication module for WWAN communication prescribed in IEEE 802.16 standard or long term evolution (LTE) standard.

The input device 320 obtains a user input. The input device 320 may include at least one of a touch screen, a physical button, a microphone for obtaining a voice-type user input, an acceleration sensor for obtaining the user input from a motion gesture of the terminal device 300, a keyboard, a mouse, and a keypad.

The control unit 330 controls the overall operation of the terminal device 300.

The display unit 340 displays information on a charging operation and a state of the cable-mounted charging control device 200. The display unit 340 may display information on a failure of the cable-mounted charging control device 200 and information on a measure to address the failure. For example, the display unit 340 may display the information on the charging operation and state of the cable-mounted charging control device 200 in a visual manner using a character, a figure or light and/or in an auditory manner using a sound.

Figure 5:
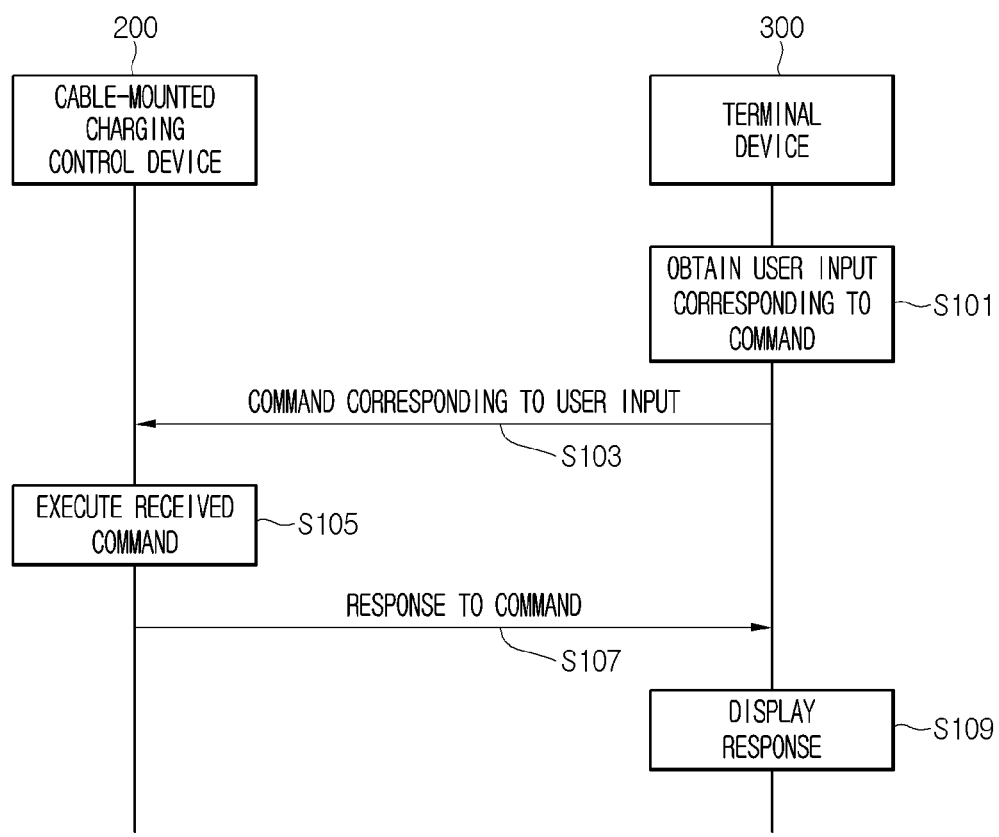
FIG. 5 is a ladder diagram illustrating an operating method of an electric vehicle charging system according to an embodiment.

FIG. 5 is a ladder diagram illustrating an operating method of the electric vehicle charging system 10 according to an embodiment.

The control unit 330 of the terminal device 300 obtains a user input for issuing a command to the vehicle charging cable assembly 20 through the input device 320 (operation S101). Here, the user input for controlling the electric vehicle charging cable assembly 20 may include at least one of a request for starting charging of the electric vehicle 100, a request for stopping charging of the electric vehicle 100, and a request for the electric vehicle charging-related information.

The control unit 330 of the terminal device 300 transmits a command corresponding to the obtained user input to the cable-mounted charging control device 200 through the communication unit 310 (operation S103). The control unit 270 of the cable-mounted charging control device 200 receives the command through the terminal device communication unit 250.

The control unit 270 of the cable-mounted charging control device 200 executes the received command (operation S105).

In detail, in the case where the command corresponding to the user input is to start charging of the electric vehicle 100, the control unit 270 of the cable-mounted charging control device 200 turns on the relay 220 so that the electric vehicle charging cable assembly 20 provides the AC power of the socket 30 to the electric vehicle 100.

In the case where the command corresponding to the user input is to stop charging of the electric vehicle 100, the control unit 270 of the cable-mounted charging control device 200 turns off the relay 220 so that the electric vehicle charging cable assembly 20 is prevented from charging the electric vehicle 100.

In the case where the command corresponding to the user input is to request the electric vehicle charging-related information, the control unit 270 of the cable-mounted charging control device 200 collects the electric vehicle charging-related information.

The control unit 270 of the cable-mounted charging control device 200 transmits a response to the received command to the terminal device 300 through the terminal device communication unit 250 (operation S107).

In the case where the command corresponding to the user input is to start charging of the electric vehicle 100, the response may include information indicating that the relay 220 is turned on.

In the case where the command corresponding to the user input is to stop charging of the electric vehicle 100, the response may include information indicating that the relay 220 is turned off.

In the case where the command corresponding to the user input is to request the electric vehicle charging-related information, the response may include the collected electric vehicle charging-related information.

The electric vehicle charging-related information may include at least one of the information on the electric vehicle 100 and the information on the electric vehicle charging cable assembly 20.

The information on the electric vehicle 100 may include at least one of an initial charging state, a current charging state, a charging start time, a predicted charging finish time, an actual charging finish time, electric vehicle charging status information, electric vehicle charging error information, information on an amount of power supplied to the electric vehicle 100, and information on an intensity of current applied to the electric vehicle 100. The initial charging state or the current charging current state may be expressed as a ratio of current charging amount to total capacity. The electric vehicle charging status information may indicate whether the electric vehicle 100 is currently charged, stands by to be charged, or is completely charged.

The information on the electric vehicle charging cable assembly 20 may include at least one of information on a charging operation of the electric vehicle charging cable assembly 20, information on a use history of the electric vehicle charging cable assembly 20, information on a state of the electric vehicle charging cable assembly 20, and information on a failure of the electric vehicle charging cable assembly 20. The information on the charging operation of the electric vehicle charging cable assembly 20 may indicate whether the electric vehicle charging cable assembly 20 provides the power of the socket 30 to the electric vehicle 100. The information on the state of the electric vehicle charging cable assembly 20 may include at least one of information on a state of the relay 220, information on whether the relay 220 is fused, information on a temperature of the electric vehicle charging cable assembly 20, information on a short circuit of the electric vehicle charging cable assembly 20, information on an open circuit of the electric vehicle charging cable assembly 20, and information on a peripheral environment of the electric vehicle charging cable assembly 20. The information on the state of the relay 220 may indicate whether the relay 220 is turned on or turned off. The information on the peripheral environment of the electric vehicle charging cable assembly 20 may include at least one of information on a peripheral temperature and information on a peripheral humidity.

The control unit 330 of the terminal device 300 displays the received response on the display unit 340 (operation S109).

In the case where the command corresponding to the user input is to start charging of the electric vehicle 100, the control unit 330 of the terminal device 300 may display, on the display unit 340, the information indicating that the relay 220 is turned on.

In the case where the command corresponding to the user input is to stop charging of the electric vehicle 100, the control unit 330 of the terminal device 300 may display, on the display unit 340, the information indicating that the relay 220 is turned off.

In the case where the command corresponding to the user input is to request the electric vehicle charging-related information, the control unit 330 of the terminal device 300 may display, on the display unit 340, the electric vehicle charging-related information. The user may provide an additional user input for controlling the electric vehicle charging cable assembly 20 to the terminal device 300 through the input device 320 with reference to the displayed electric vehicle charging-related information.

As described above, the information on the charging operation of the electric vehicle charging cable assembly 20 and the information on the state of the electric vehicle charging cable assembly 20 are displayed through the terminal device 300. Therefore, the user may easily recognize the information on the charging operation and state of the electric vehicle charging cable assembly 20. Furthermore, the user may easily determine whether a failure occurs in the electric vehicle charging cable assembly 20 and detect a failure portion on the basis of the information on the state of the electric vehicle charging cable assembly 20, so as to take a measure corresponding to the failure. According to the related art, a short circuit of a ground wire between the electric vehicle charging cable assembly 20 and a commercial power supply cannot be detected. However, according to the present embodiment, the detection unit 230 detects whether a short circuit occurs and displays the occurrence of the short circuit so that the user may stop the charging operation of the electric vehicle charging cable assembly 20 to repair the short circuit or make a request for repair. In particular, in the case where the information on the failure of the electric vehicle charging cable assembly 20 and the information on the measure to address the failure are transmitted from the cable-mounted charging control device 200 to the terminal device 300, the user may more easily detect the failure and take a measure accordingly. Therefore, the user may predict a failure of charging the electric vehicle 100 due to the failure of the electric vehicle charging cable assembly 20. Furthermore, for example, in the case where the use history of the electric vehicle charging cable assembly 20 is transmitted to the terminal device 300, the user may predict the life of the electric vehicle charging cable assembly 20 so as to prepare an additional electric vehicle charging cable assembly.

When the electric vehicle charging cable assembly 20 is frequently used under inferior conditions, frequent repair or replacement may be required. However, in the case where the electric vehicle charging cable assembly 20 includes the cable-mounted charging control device 200 with the terminal device communication unit 250 that is relatively expensive, the repair may be difficult and the cost of the replacement may be high since the cable-mounted charging control device 200 is manufactured to be resistant to external temperature, external humidity, vibration and impact.

To overcome this limitation, the terminal device communication unit of the cable-mounted charging control device 200 may be separated therefrom. This embodiment will be described with reference to FIGS. 6 to 11.

Figure 6:
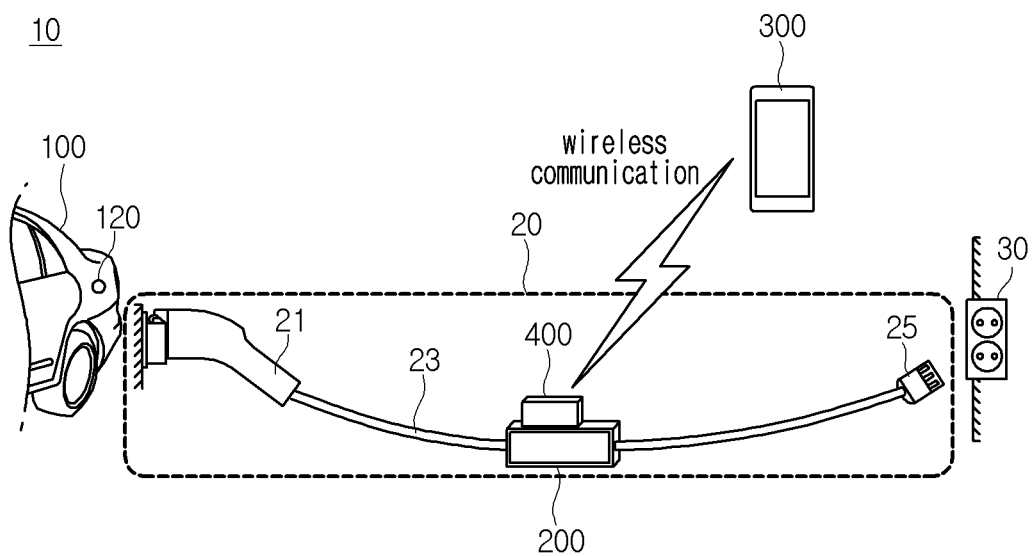
FIG. 6 is a conceptual diagram illustrating an electric vehicle charging system according to another embodiment.

FIG. 6 is a conceptual diagram illustrating an electric vehicle charging system according to another embodiment.

Referring to FIG. 6, the electric vehicle charging system 10 according to an embodiment includes the electric vehicle 100, the electric vehicle charging cable assembly 20, the socket 30, the terminal device 300, and an add-on communication device 400.

Since the socket 30 and the electric vehicle 100 are the same as or similar to those of FIG. 1, detailed descriptions thereof are omitted below.

The electric vehicle charging cable assembly 20 transfers the AC power from the socket 30 to the electric vehicle 100.

The electric vehicle charging cable assembly 20 includes the cable-mounted charging control device 200, the electric vehicle connector 21, the power cable 23, and the plug 25.

Since the power cable 23, the electric vehicle connector 21 and the plug 25 are the same as or similar to those of FIG. 1, detailed descriptions thereof are omitted below.

The cable-mounted charging control device 200 monitors charging of the electric vehicle 100, provides the charging-related information obtained through the monitoring to the add-on communication device 400, and controls the charging of the electric vehicle 100. The cable-mounted charging control device 200 is attached to the power cable 23 by the user so as to be integrated with the power cable 23 and not to be easily separated from the power cable 23, and is resistant to external temperature, external humidity, vibration and impact. In the case where the cable-mounted charging control device 200 is provided with a connector for wired communication, the cable-mounted charging control device may be vulnerable to an external environment since the connector includes a metal terminal. To overcome this limitation, the cable-mounted charging control device 200 may wirelessly communicate with the add-on communication device 400.

The terminal device 300 wirelessly communicates with the add-on communication device 400 in a noncontact manner so as to display information on the electric vehicle charging cable assembly 20.

The add-on communication device 400 is attached to the cable-mounted charging control device 200. Here, the add-on communication device 400 may be mechanically attached to the cable-mounted charging control device 200. Alternatively, the add-on communication device 400 may be magnetically attached to the cable-mounted charging control device 200.

Figure 7:
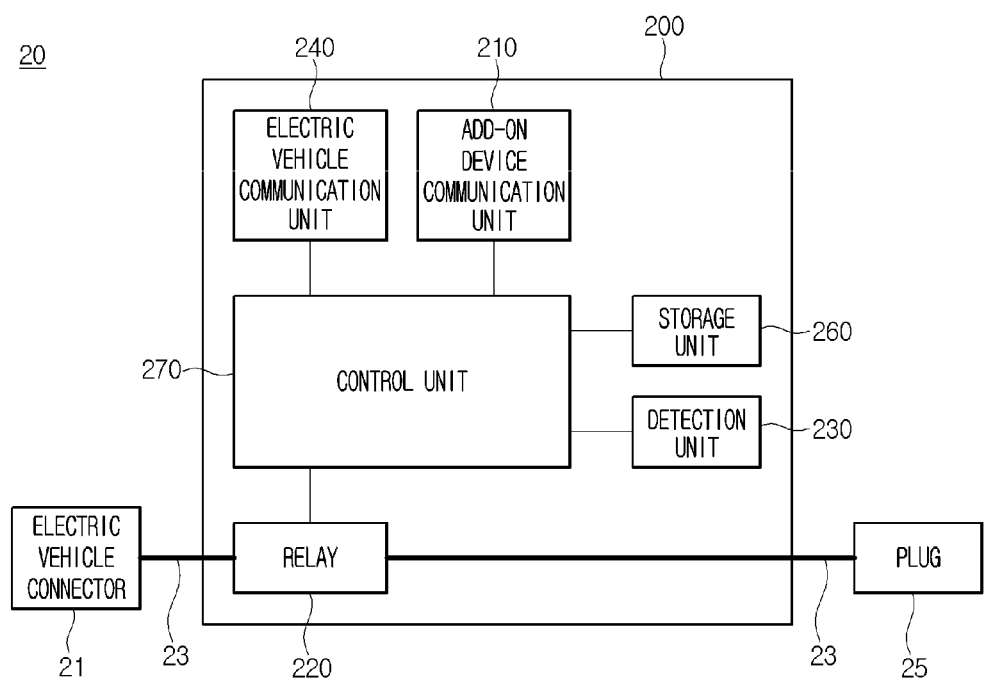
FIG. 7 is a diagram illustrating an electric vehicle charging cable assembly according to another embodiment.

FIG. 7 is a diagram illustrating the electric vehicle charging cable assembly according to another embodiment.

As described above, the electric vehicle charging cable assembly 20 includes the cable-mounted charging control device 200, the electric vehicle connector 21, the power cable 23, and the plug 25.

Here, the cable-mounted charging control device 200 includes an add-on device communication unit 210, the relay 220, the detection unit 230, the electric vehicle communication unit 240, the storage unit 260, and the control unit 270. Compared to the embodiment of FIG. 3, the cable-mounted charging control device 200 illustrated in FIG. 7 further includes the add-on device communication unit 210. The cable-mounted charging control device 200 illustrated in FIG. 7 may not be provided with the terminal device communication unit 250 in order to reduce the price and repair cost of the cable-mounted charging control device. However, the cable-mounted charging control device 200 may include the terminal device communication unit 250 depending on the application of the cable-mounted charging control device 200.

The operations of the relay 220, the electric vehicle communication unit 240, the storage unit 260 and the control unit 270 are the same as or similar to those of the relay 220, the electric vehicle communication unit 240, the storage unit 260 and the control unit 270 illustrated in FIG. 3, or will be described later.

The add-on device communication unit 210 communicates with the add-on communication device 400. The add-on device communication unit 210 may communicate with the add-on communication device 400 using a communication technology such as infrared data association (IrDA), radio frequency communication, Bluetooth, ultra wideband (UWB) communication, ZigBee, or digital living network alliance (DLNA).

In particular, the IrDA technology may be applied to the add-on device communication unit 210 to reduce the prices of the electric vehicle charging cable assembly 20 and the add-on communication device 400. Here, the add-on device communication unit 210 may include an infrared light-emitting diode and an infrared light-receiving diode.

Figure 8:
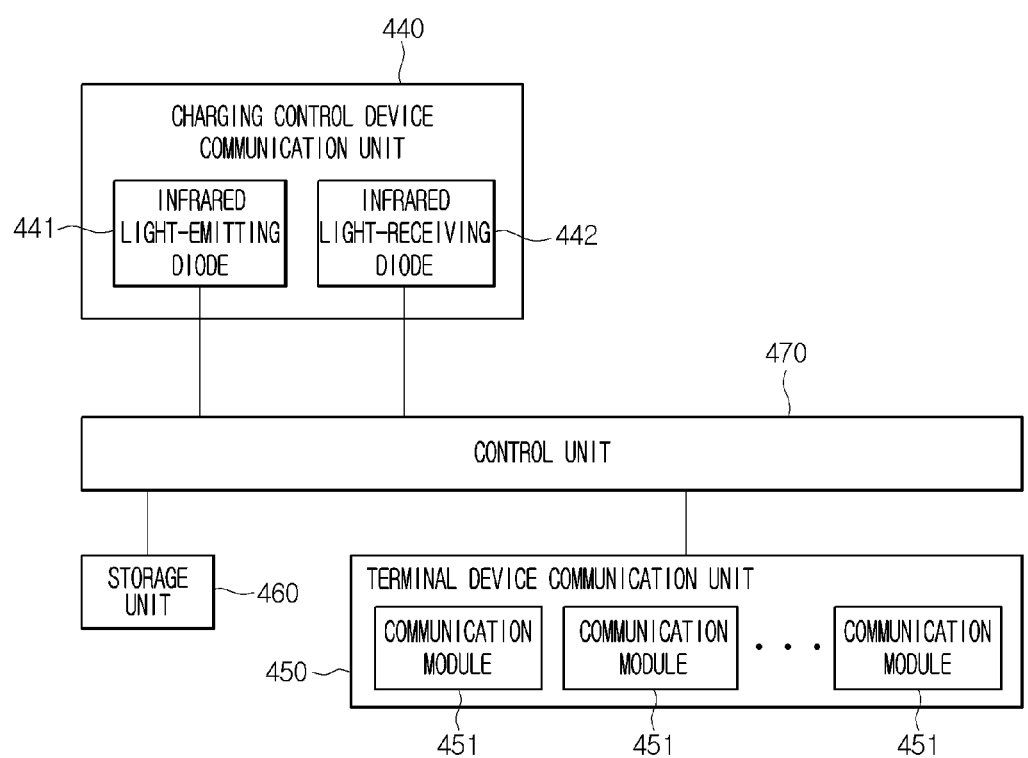
FIG. 8 is a block diagram illustrating an add-on communication device according to an embodiment.

FIG. 8 is a block diagram illustrating the add-on communication device according to an embodiment.

The add-on communication device 400 includes an attachment check request signal generation unit 410, an attachment check unit 420, a charging control device communication unit 440, a terminal device communication unit 450, a storage unit 460, and a control unit 470.

The charging control device communication unit 440 communicates with the cable-mounted charging control device 200. In detail, the charging control device communication unit 440 communicates with the add-on device communication unit 210 of the cable-mounted charging control device 200. The charging control device communication unit 440 may communicate with the add-on device communication unit 210 using a communication technology such as infrared data association (IrDA), radio frequency communication, Bluetooth, ultra wideband (UWB) communication, ZigBee, or digital living network alliance (DLNA).

The IrDA technology may be applied to the charging control device communication unit 440 to reduce the prices of the electric vehicle charging cable assembly 20 and the add-on communication device 400. Here, the charging control device communication unit 440 may include an infrared light-emitting diode 441 and an infrared light-receiving diode 442.

In the case where the add-on communication device 400 is attached to the cable-mounted charging control device 200 normally, the positions of the infrared light-emitting diode 441 and the infrared light-receiving diode 442 of the charging control device communication unit 440 are matched to those of the infrared light-receiving diode and the infrared light-emitting diode of the add-on device communication unit 210 of the cable-mounted charging control device 200.

The terminal device communication unit 450 communicates with the terminal device 300. In detail, the terminal device communication unit 450 communicates with the communication unit 310 of the terminal device 300. In particular, the terminal device communication unit 450 may communicate with the communication unit 310 using a communication technology such as infrared data association (IrDA), radio frequency communication, Bluetooth, ultra wideband (UWB) communication, ZigBee, or digital living network alliance (DLNA). In particular, the terminal device communication unit 450 may communicate with the terminal device 300 using at least one of a wireless local area network (WLAN) such as WI-FI prescribed in IEEE 802.11 standard and a wireless wide area network (WWAN) prescribed in IEEE 802.16 standard or long term evolution (LTE) standard.

The terminal device communication unit 450 may include a plurality of communication modules 451. In detail, the plurality of communication modules 451 may include an infrared communication module, a Bluetooth communication module, a wireless local area network (WLAN) communication module for WLAN communication such as WI-FI, and a wireless wide area network (WWAN) communication module for WWAN communication prescribed in IEEE 802.16 standard or long term evolution (LTE) standard.

The storage unit 460 stores various pieces of information that will be described later. In detail, the storage unit 460 may store the electric vehicle charging-related information. The storage unit 460 may store information on the use history of the cable-mounted charging control device 200. For example, the storage unit 460 may store information on a most recent use time and an accumulated use time of the cable-mounted charging control device 200.

The control unit 470 controls the overall operation of the add-on communication device 400.

The add-on communication device 400 does not electrically directly contact with the cable-mounted charging control device 200, and thus may need to receive additional power. However, when the user does not use the add-on communication device 400, the user may not block power supplied to the add-on communication device 400. Then, unnecessary power consumption may increase. Therefore, a method of reducing the power consumption when the add-on communication device 400 is not used may be required.

Figure 9:
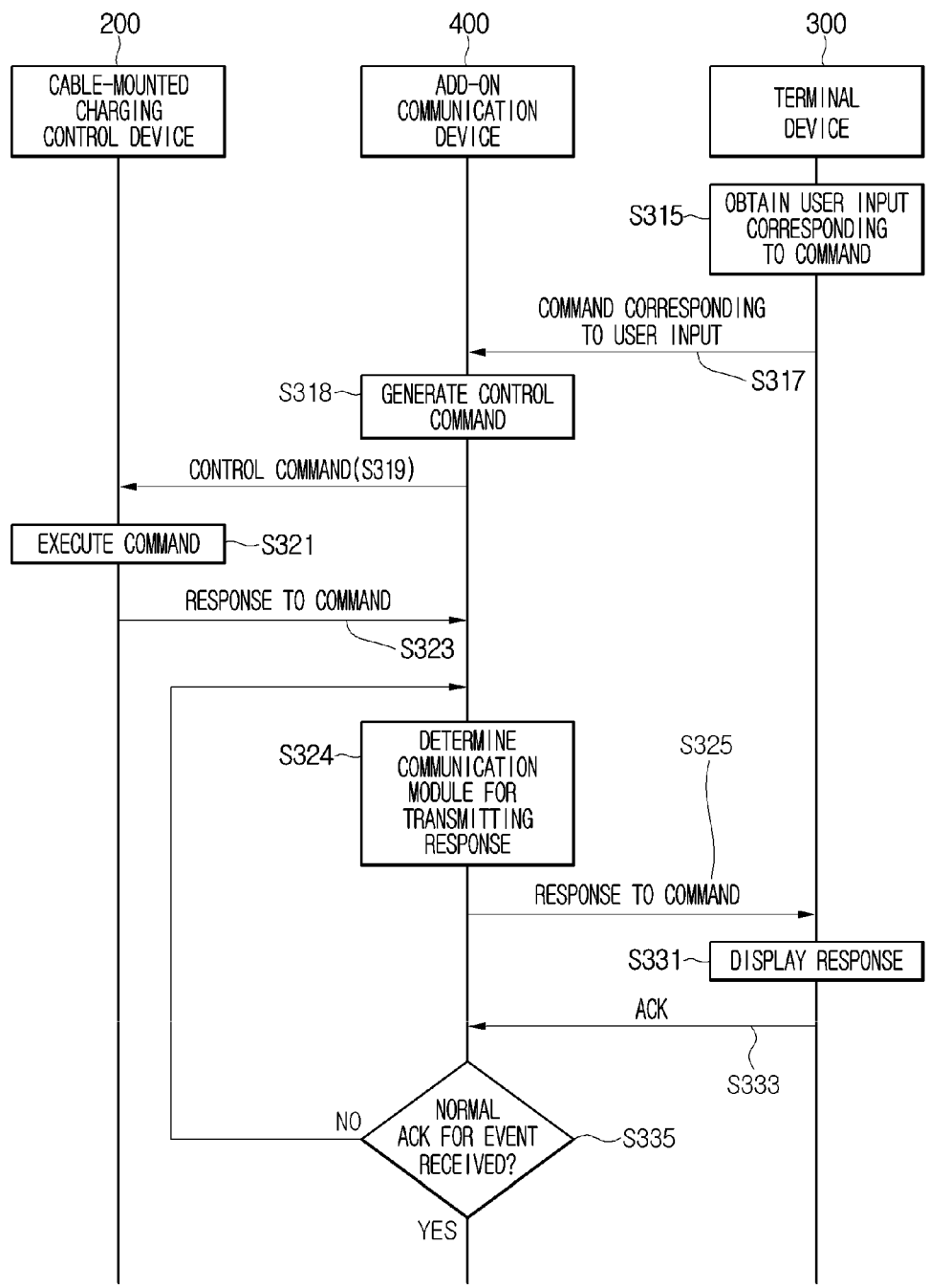
FIG. 9 is a ladder diagram illustrating an operating method of an electric vehicle charging system according to another embodiment.

FIG. 9 is a ladder diagram illustrating an operating method of the electric vehicle charging system 10 according to another embodiment.

The control unit 330 of the terminal device 300 obtains a user input for issuing a command to the vehicle charging cable assembly 20 through the input device 320 (operation S315). Here, the user input for controlling the electric vehicle charging cable assembly 20 may include at least one of a request for starting charging of the electric vehicle 100, a request for stopping charging of the electric vehicle 100, and a request for the electric vehicle charging-related information.

The control unit 330 of the terminal device 300 transmits a command corresponding to the obtained user input to the add-on communication device 400 through the communication unit 310 (operation S317). The control unit 470 of the add-on communication device 400 may receive the command from the terminal device 300 through the terminal device communication unit 450. Here, a set of values that may be represented by the command may include a request for starting charging of the electric vehicle 100, a request for stopping charging of the electric vehicle 100, and a request for the electric vehicle charging-related information.

The control unit 470 of the add-on communication device 400 generates a control command for controlling the cable-mounted charging control device 200 (operation S318). The control unit 470 of the add-on communication device 400 may generate the control command on the basis of at least one of the command received from the terminal device 300, a current position, configuration information, and a charging state of the electric vehicle 100 which is obtained as a result of monitoring described below. Here, a set of values that may be represented by the control command may include a request for starting charging, a request for stopping charging, and a request for the electric vehicle charging-related information.

According to an embodiment, when the command received from the terminal device 300 is to start charging, the control unit 470 of the add-on communication device 400 may generate the control command indicating the start of charging.

According to an embodiment, when the command received from the terminal device 300 is to stop charging, the control unit 470 of the add-on communication device 400 may generate the control command indicating the suspension of charging.

According to an embodiment, when the command received from the terminal device 300 is to request the electric vehicle charging-related information, the control unit 470 of the add-on communication device 400 may generate the control command indicating the request for the electric vehicle charging-related information.

The control unit 470 of the add-on communication device 400 transmits the generated control command to the cable-mounted charging control device 200 through the charging control device communication unit 440 (operation S319). The infrared light-emitting diode 441 of the charging control device communication unit 440 may radiate an infrared ray having a digital pattern corresponding to the generated control command.

The control unit 270 of the cable-mounted charging control device 200 executes the received control command (operation S321).

In detail, in the case where the command corresponding to the user input is to start charging of the electric vehicle 100, the control unit 270 of the cable-mounted charging control device 200 turns on the relay 220 so that the electric vehicle charging cable assembly 20 provides the AC power of the socket 30 to the electric vehicle 100.

In the case where the command corresponding to the user input is to stop charging of the electric vehicle 100, the control unit 270 of the cable-mounted charging control device 200 turns off the relay 220 so that the electric vehicle charging cable assembly 20 is prevented from charging the electric vehicle 100.

In the case where the command corresponding to the user input is to request the electric vehicle charging-related information, the control unit 270 of the cable-mounted charging control device 200 collects the electric vehicle charging-related information.

The control unit 270 of the cable-mounted charging control device 200 transmits a response to the received command to the add-on communication device 400 through the add-on device communication unit 210 (operation S323). The infrared light-emitting diode of the add-on device communication unit 210 of the cable-mounted charging control device 200 may radiate an infrared ray having a digital pattern corresponding to the response to the received command. The control unit 470 of the add-on communication device 400 may receive the response from the cable-mounted charging control device 200 through the charging control device communication unit 440.

In the case where the command corresponding to the user input is to start charging of the electric vehicle 100, the response may include information indicating that the relay 220 is turned on.

In the case where the command corresponding to the user input is to stop charging of the electric vehicle 100, the response may include information indicating that the relay 220 is turned off.

In the case where the command corresponding to the user input is to request the electric vehicle charging-related information, the response may include the collected electric vehicle charging-related information. As described above, the electric vehicle charging-related information may include at least one of the information on the electric vehicle 100 and the information on the electric vehicle charging cable assembly 20.

The control unit 470 of the add-on communication device 400 determines a communication module to be used to transmit the response received from the cable-mounted charging control device 200, from among the plurality of communication modules 451 (operation S324). The determination of the communication module will be described in detail later.

The control unit 470 of the add-on communication device 400 transmits a response message including the received response to the terminal device 300 through the determined communication module 451 (operation S325).

The control unit 330 of the terminal device 300 displays the response included in the received response message on the display unit 340 (operation S331). Since above-described operation S109 may be applied to operation S331, operation S331 will not be described.

The control unit 330 of the terminal device 300 transmits an acknowledgement message ACK indicating normal reception of the response message to the add-on communication device 400 through the communication module 311 through which the response has been received from among the plurality of communication modules 311 (operation S333).

The control unit 470 of the add-on communication device 400 checks whether the acknowledgement message ACK for the response is received normally through the communication module 451 through which the response message has been transmitted (operation S335).

In the case where the acknowledgement message ACK for the response is received, before a lapse of a reference time after the transmission of the response, through the communication module 451 through which the response has been transmitted, the control unit 470 of the add-on communication device 400 may determine that the reception of the acknowledgement message ACK for the response is normal.

In the case where the acknowledgement message ACK for the response is received, after a lapse of the reference time after the transmission of the response, the control unit 470 of the add-on communication device 400 may determine that the reception of the acknowledgement message ACK for the response is abnormal.

In the case where the acknowledgement message ACK for the response is not received, after the transmission of the response, the control unit 470 of the add-on communication device 400 may determine that the reception of the acknowledgement message ACK for the response is abnormal.

In the case where the acknowledgement message ACK for the response is received through a communication module other than the communication module 451 through which the response has been transmitted, the control unit 470 of the add-on communication device 400 may determine that the reception of the acknowledgement message ACK for the response is abnormal.

In the case where the reception of the acknowledgement message ACK for the response is determined to be normal, the control unit 470 of the add-on communication device 400 may finish the procedure for transmitting the response.

In the case where the reception of the acknowledgement message ACK for the response is determined to be abnormal, the control unit 470 of the add-on communication device 400 may determine a communication module for transmitting the response again so as to retransmit the response.

Figure 10:
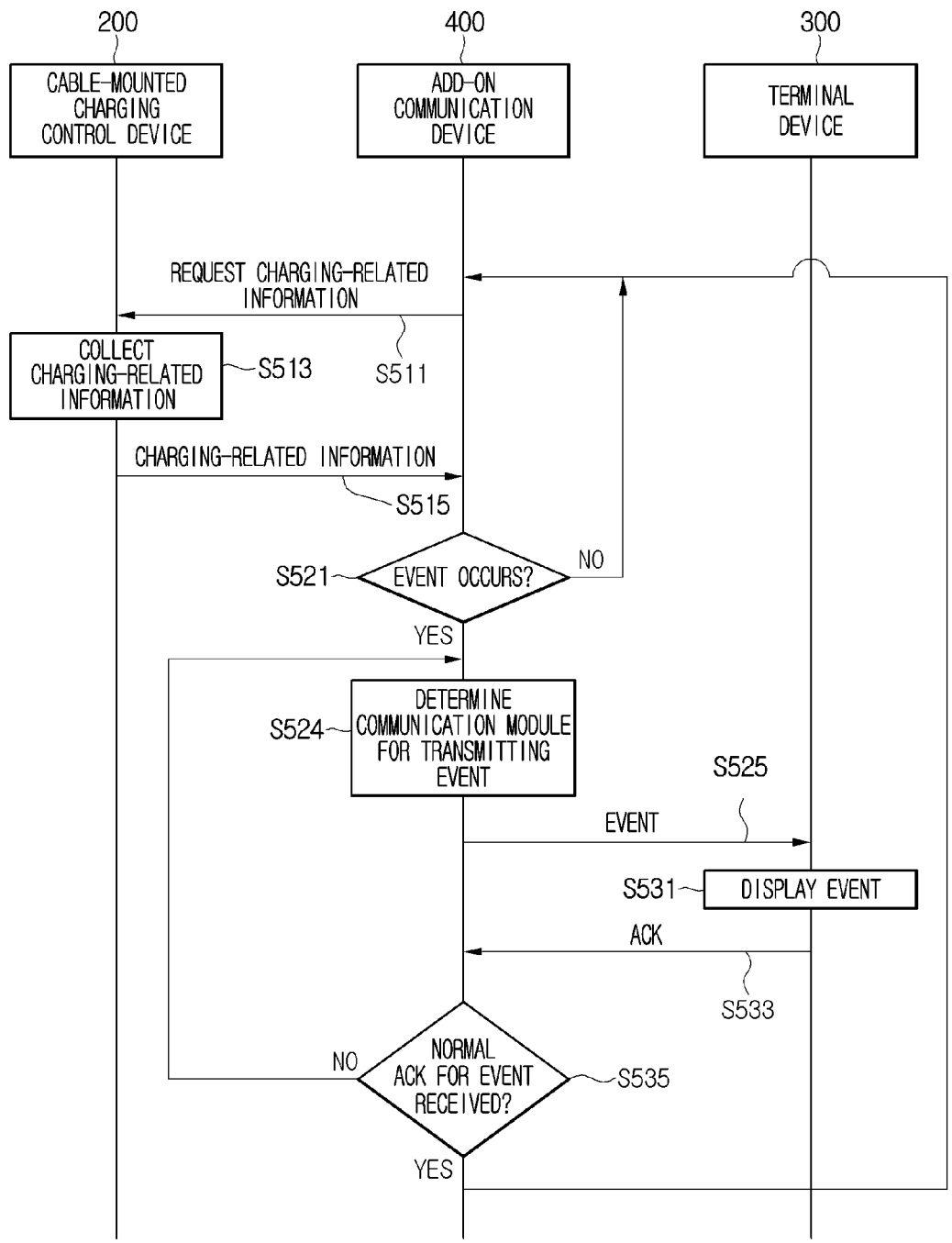
FIG. 10 is a ladder diagram illustrating an operating method of an electric vehicle charging system according to another embodiment.

FIG. 10 is a ladder diagram illustrating an operating method of the electric vehicle charging system 10 according to another embodiment.

The control unit 470 of the add-on communication device 400 transmits a charging-related information request message to the cable-mounted charging control device 200 through the charging control device communication unit 440 (operation S511). The infrared light-emitting diode 441 of the charging control device communication unit 440 may radiate an infrared ray having a digital pattern corresponding to the charging-related information request message.

The control unit 270 of the cable-mounted charging control device 200 collects the charging-related information.

The control unit 270 of the cable-mounted charging control device 200 transmits a response message including the charging-related information to the add-on communication device 400 through the add-on device communication unit 210 (operation S515). The infrared light-emitting diode of the add-on device communication unit 210 of the cable-mounted charging control device 200 may radiate an infrared ray having a digital pattern corresponding to the response message including the charging-related information. The control unit 470 of the add-on communication device 400 may receive the response message including the charging-related information from the cable-mounted charging control device 200 through the charging control device communication unit 440.

In this manner, the control unit 470 of the add-on communication device 400 may monitor the charging-related information by requesting and receiving the charging-related information.

The control unit 470 of the add-on communication device 400 checks whether a charging-related event to be reported to the terminal device 300 occurs on the basis of the charging-related information (operation S521).

According to an embodiment, the charging-related event may include at least one of completion of charging of the electric vehicle 100, occurrence of an error in charging of the electric vehicle 100, the intensity of current applied to the electric vehicle 100 being outside a normal range, occurrence of a failure in the electric vehicle charging cable assembly 20, change of an on/off state of the relay 220, occurrence of fusion of the relay 220, a temperature of the electric vehicle charging cable assembly 20 being outside a normal range, occurrence of a short circuit of the electric vehicle charging cable assembly 20, occurrence of an open circuit of the electric vehicle charging cable assembly 20, and a peripheral environment factor (temperature, humidity) of the electric vehicle charging cable assembly 20 being outside a normal range.

The control unit 470 of the add-on communication device 400 determines a communication module to be used to transmit an event message including an occurring event, from among the plurality of communication modules 451

(operation S524). The determination of the communication module for transmitting the message will be described in detail later.

The control unit 470 of the add-on communication device 400 transmits the event message to the terminal device 300 through the determined communication module 451 (operation S525).

The control unit 330 of the terminal device 300 displays the event that has occurred on the display unit 340 (operation S531).

The control unit 330 of the terminal device 300 transmits an acknowledgement message ACK indicating normal reception of the event message to the add-on communication device 400 through the communication module 311 through which the event message has been received from among the plurality of communication modules 311 (operation S533).

The control unit 470 of the add-on communication device 400 checks whether the acknowledgement message ACK for the event message is received normally through the communication module 451 through which the event message has been transmitted (operation S535).

In the case where the acknowledgement message ACK for the event is received, before a lapse of a reference time after the transmission of the event, through the communication module 451 through which the event has been transmitted, the control unit 470 of the add-on communication device 400 may determine that the reception of the acknowledgement message ACK for the event is normal.

In the case where the acknowledgement message ACK for the event is received, after a lapse of the reference time after the transmission of the event, the control unit 470 of the add-on communication device 400 may determine that the reception of the acknowledgement message ACK for the event is abnormal.

In the case where the acknowledgement message ACK for the event is not received, after the transmission of the event, the control unit 470 of the add-on communication device 400 may determine that the reception of the acknowledgement message ACK for the event is abnormal.

In the case where the acknowledgement message ACK for the event is received through a communication module other than the communication module 451 through which the event has been transmitted, the control unit 470 of the add-on communication device 400 may determine that the reception of the acknowledgement message ACK for the event is abnormal.

In the case where the reception of the acknowledgement message ACK for the event is determined to be normal, the control unit 470 of the add-on communication device 400 may finish the procedure for transmitting the event.

In the case where the reception of the acknowledgement message ACK for the event is determined to be abnormal, the control unit 470 of the add-on communication device 400 may determine a communication module for transmitting the event again so as to retransmit the event.

Figure 11:
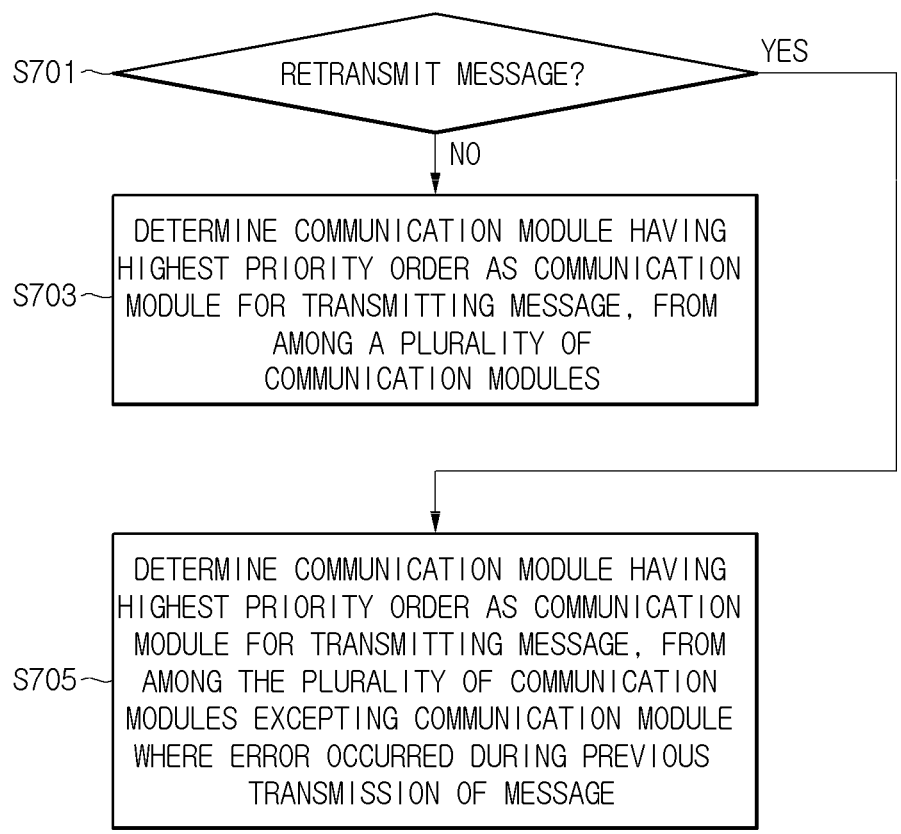
FIG. 11 is a flowchart illustrating a method of determining, by an add-on communication device, a communication module for transmitting a message according to an embodiment.

FIG. 11 is a flowchart illustrating a method of determining, by the add-on communication device 400, a communication module for transmitting a message according to an embodiment.

The control unit 470 of the add-on communication device 400 checks whether a message is to be initially transmitted or is to be retransmitted (operation S701). As described above, the message may be the response message or the event message.

If the message is to be initially transmitted, the control unit 470 of the add-on communication device 400 determines a communication module having a highest priority order as a communication module to be used to transmit the message, from among the plurality of communication modules 451 (operation S703).

If the message is to be retransmitted, the control unit 470 of the add-on communication device 400 determines a communication module having a highest priority order as a communication module to be used to transmit the message, from among the plurality of communication modules 451 excepting a communication module where an error occurred during previous transmission of the message (operation S705).

According to an embodiment, if a message received from the terminal device 300 exists immediately before transmitting a message to be transmitted, the control unit 470 of the add-on communication device 400 may assign a highest priority order to the communication module 451 through which the immediately previous message has been received.

According to an embodiment, the control unit 470 of the add-on communication device 400 may assign in advance priority orders to the plurality of communication modules 451 so that a communication module for transmitting the message is determined according to the priority orders. For example, the control unit 470 may assign higher priority orders in order of an infrared communication module, a Bluetooth communication module, a WLAN communication module and a WWAN communication module.

In a particular case, the terminal device 300 may have a WLAN communication module and a WWAN communication module, and the add-on communication device 400 may also have a WLAN communication module and a WWAN communication module. The user may frequently turn off a WWAN communication module to save assigned data. The user may be unable to use a WLAN communication module at the outside of the coverage of a local network. In such a case, the add-on communication device 400 may adaptively select one of a WLAN communication module and a WWAN communication module for transmitting a message so that the terminal device 300 receives the message normally. In particular, considering that the event message may need to be urgently reported to the user, it is very important to transfer the event message correctly. Even in this case, the add-on communication device 400 may correctly transfer the event message.

According to an embodiment, the above-mentioned methods may be implemented with processor-readable codes in a program-recorded medium. The processor-readable recording medium includes, for example, a ROM, a RAM, a CD-ROM, a magnetic tape, a floppy disk, and an optical data storage device, and may also be implemented as a form of a carrier wave (for example, transmission via the Internet).

According to the embodiments, the characteristics of the cable-mounted charging control device that is resistant to external temperature, external humidity, vibration and impact may be maintained, and the cable-mounted charging control device may be easily repaired. Furthermore, the electric vehicle charging-related information may be provided to a user conveniently without increasing the cost of replacing the cable-mounted charging control device.

According to the embodiments, even when the user turns off a WWAN communication module to save assigned data, or the user is unable to use a WLAN communication module at the outside of the coverage of a local network, the add-on communication device may adaptively select a communication module for transmitting a message so that the terminal device receives the message normally.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An add-on communication device attached to a cable-mounted charging control device attached to a cable assembly for charging an electric vehicle, the add-on communication device comprising:
   a charging control device communication unit configured to communicate with the cable-mounted charging control device, wherein the charging control device communication unit comprises an infrared light-emitting diode and an infrared light-receiving diode;
   a terminal device communication unit configured to communicate with a terminal device wherein the terminal device communication unit comprises a plurality of communication modules including an infrared communication module, a BLUETOOTH communication module, a wireless local area network (WLAN) communication module, and a wireless wide area network (WWAN) communication module; and
   a control unit configured to:
      control the charging control device communication unit and the terminal device communication unit;
      assign priority orders to the plurality of communication modules in order of the infrared communication module, the BLUETOOTH communication module, the WLAN communication module, and the WWAN communication module such that the infrared communication module is assigned with a highest priority order and the WWAN communication module is assigned with a lowest priority order among the plurality of communication modules;
      generate a message;
      determine a first communication module for transmitting the message from among the plurality of communication modules;
      determine a second communication module for transmitting the message from among the plurality of communication modules other than the first communication module when it is determined that transmitting the message via the first communication module will be unsuccessful; and
      transmit the message to the terminal device via the determined one of first communication module and second communication module,
   wherein the first communication module and the second communication module are determined on the basis of the priority orders assigned to the plurality of communication modules.

2. The add-on communication device according to claim 1, wherein the control unit is further configured to obtain charging-related information from the cable-mounted charging control device and generate the message on the basis of the charging-related information.

3. The add-on communication device according to claim 2, wherein the control unit is further configured to check whether a charging-related event occurs on the basis of the charging-related information and generate the message comprising the charging-related event when the charging-related event occurs.

4. The add-on communication device according to claim 3, wherein the charging-related event comprises at least:
   completion of charging of the electric vehicle,
   occurrence of an error in charging of the electric vehicle,
   an intensity of current applied to the electric vehicle being outside a normal range,
   occurrence of a failure in the cable assembly,
   change of an on/off state of a relay in the cable-mounted charging control device,
   occurrence of fusion of the relay in the cable-mounted charging control device,
   a temperature of the cable assembly being outside a normal range,
   occurrence of a short circuit of the cable assembly,
   occurrence of an open circuit of the cable assembly, or
   a peripheral environment factor of the cable assembly being outside a normal range.

5. The add-on communication device according to claim 2, wherein the control unit is further configured to generate the message comprising the charging-related information on the basis of the charging-related information.

6. The add-on communication device according to claim 5, wherein the charging-related information comprises at least information on the electric vehicle or information on the cable assembly.

7. The add-on communication device according to claim 1, wherein the control unit is further configured to assign a highest priority order to a communication module from among the plurality of communication modules that has received an immediately previous message from the communication device immediately before transmitting the message.

8. A method for operating an add-on communication device attached to a cable-mounted charging control device attached to a cable assembly for charging an electric vehicle, the method comprising:
   transmitting a request for charging-related information from the cable-mounted charging control device via an infrared light-emitting diode;
   receiving the charging-related information from the cable-mounted charging control device through an infrared light-receiving diode;
   generating a message on the basis of the charging-related information;
   assigning priority orders to a plurality of communication modules configured to communicate with a terminal device, the plurality of communication modules including an infrared communication module, a BLUETOOTH communication module, a wireless local area network (WLAN) communication module, and a wireless wide area network (WWAN) communication module,
   wherein the priority orders are assigned in order of the infrared communication module, the Bluetooth communication module, the WLAN communication module, and the WWAN communication module;
   determining a first communication module for transmitting the message from among the plurality of communication modules;
   determining a second communication module for transmitting the message from among the plurality of communication modules other than the first communication module when it is determined that transmitting the message via the first communication module will be unsuccessful; and transmitting the message to the terminal device via the determined one of first communication module and second communication module, wherein the first communication module and the second communication module are determined on the basis of the priority orders assigned to the plurality of communication modules.

9. The method according to claim 8, wherein generating the message on the basis of the charging-related information comprises:

checking whether a charging-related event occurs on the basis of the charging-related information; and generating the message comprising the charging-related event when the charging-related event occurs.

10. The method according to claim 9, wherein the charging-related event comprises at least:

completion of charging of the electric vehicle, occurrence of an error in charging of the electric vehicle, an intensity of current applied to the electric vehicle being outside a normal range, occurrence of a failure in the cable assembly, change of an on/off state of a relay in the cable-mounted charging control device, occurrence of fusion of the relay in the cable-mounted charging control device, a temperature of the cable assembly being outside a normal range, occurrence of a short circuit of the cable assembly, occurrence of an open circuit of the cable assembly, or a peripheral environment factor of the cable assembly being outside a normal range.

11. The method according to claim 10, wherein the message comprises the charging-related information.

12. The method according to claim 11, wherein the charging-related information comprises at least information on the electric vehicle or information on the cable assembly.

13. The method according to claim 8, further comprising assigning a highest priority order to a communication module from among the plurality of communication modules that has received an immediately previous message from the communication device immediately before transmitting the message.

* * * * *